United States Patent Office 2,724,643
Patented Nov. 22, 1955

2,724,643

HALOHYDROCARBYL SUBSTITUTED AROMATIC ACIDS AND DERIVATIVES THEREOF

Rupert C. Morris, Berkeley, and Vernon W. Buls, Walnut Creek, Calif., assignors to Shell Development Company, Emeryville, Calif., a corporation of Delaware No Drawing. Application December 4, 1950, Serial No. 199,136

17 Claims. (Cl. 71—2.6)

This invention relates to a new class of halogen-containing organic compounds. More particularly, the invention relates to novel halohydrocarbyl substituted aromatic acids and derivatives thereof, and to their utilization, particularly in the preparation of herbicidal and fungicidal compositions and improved resinous compositions.

Specifically, the invention provides new and particularly useful aromatic acids having at least one of the ring carbon atoms attached to a hydrocarbon radical which when attached to the aromatic ring contains at least one quaternary carbon atom which is joined to at least one halo-substituted aliphatic carbon atom. The invention further provides useful and valuable derivatives of these acids, particularly their esters, salts and amides. The invention still further provides compositions containing the aforedescribed acids and derivatives.

It is an object of the invention to provide a new class of halogen-containing organic compounds. It is a further object to provide novel halohydrocarbyl substituted aromatic acids and a method for their preparation. It is a further object to provide valuable esters, salts and amides of these halohydrocarbyl aromatic acids. It is a further object to provide a new class of halogen-containing organic compounds possessing unique properties which make them particularly useful and valuable in industry. It is a further object to provide halohydrocarbyl substituted aromatic acids and their derivatives which are valuable in the preparation of herbicidal and fungicidal compositions. It is a further object to provide esters of the halohydrocarbyl aromatic acids which are superior plasticizers for organic resinous compositions. It is a further object to provide unsaturated esters which may be polymerized to produce resins having excellent fungicidal properties and flame-resistant properties. Other objects and advantages of the invention will be apparent from the following detailed description thereof.

It has now been discovered that these and other objects may be accomplished by aromatic acids having at least one of the ring carbon atoms joined to a hydrocarbon radical which when attached to the said ring carbon atom contains at least one quaternary carbon atom which is joined to at least one halo-substituted aliphatic carbon atom, and derivatives of these acids, particularly their esters, salts, and amides. These novel compounds and particularly the acids and salts have been found to be particularly useful in the preparation of herbicidal, fungicidal and insecticidal compositions as they possess unexpectedly high toxic action against weeds, fungi and many common insects. They are particularly superior in these applications as the halogen atoms have unusually high stability and the compounds retain their activity over a very long period of time. The novel acids are particularly preferred in the preparation of herbicidal compositions as they endow the composition with increased ability to penetrate the plant structure.

The derivatives of the novel halohydrocarbyl substituted aromatic acids, and particularly the esters and amides, are also of value as plasticizers for organic resinous compositions, such as the vinyl chloride and vinylidene chloride polymers. In addition to their ability to improve the flexibility and pliability of these compositions, they present the added advantage of endowing the resulting plasticized article with increased fire resistance as well as improved toxicity toward insects and fungi. The unsaturated esters of novel halohydrocarbyl aromatic acids may also be polymerized to produce products having excellent fungicidal and flame-resistant properties.

As indicated, the novel acids of the invention comprise the aromatic acids which have one or more of their ring carbon atoms joined to a hydrocarbon radical which when attached to the said ring carbon atom contains at least one quaternary carbon atom which is joined to at least one halo-substituted aliphatic carbon atom. For brevity, the aforedescribed hydrocarbon radical side chain substituted with the halogen atoms will be referred to herein as a "halohydrocarbyl" radical and the aforedescribed acids as "halohydrocarbyl substituted aromatic acids." The novel acids may be monocarboxylic or polycarboxylic and the aromatic nucleus may consist of one or more benzene rings. The ring or rings may be further substituted, if desired, with other substituents, particularly additional halogen atoms which increase the activity of the compounds. The hydrocarbon radical side chain to which the essential halogen atoms are attached preferably has a tertiary carbon atom at the free end of the radical and when the radical is attached to the ring that carbon atom becomes a quaternary carbon atom. The less preferred and less active side chain radicals are those having a quaternary carbon atom further removed, e. g., 1 to 4 carbon atoms, from the end of that radical. The halogens attached to the side chain radical as well as those that may be attached to the aromatic ring may be chlorine, bromine, iodine, fluorine or any combination thereof. At least one and preferably 1 to 3 of the halogens are attached to aliphatic carbon atoms joined to the quaternary carbon atom, the others may be attached to any other portion of the radical. Examples of the halohydrocarbyl radicals attached to the aromatic ring include chloro-tert-butyl, dichloro-tert-butyl, 1,1-dimethyl-3-fluoro-butenyl, trichloro-tert-butyl, dibromo-tert-amyl, triiodo-tert-nonyl, 1,1-di(chloromethyl)-2-cyclohexyl-ethyl, 2,2,4,4-tetra-(chlormethyl)-6-bromohexyl, and the like. The total number of halogen atoms attached to the ring and the side chain preferably vary from 1 to 8 and in many cases from 1 to 4.

Illustrative examples of the above-described halohydrocarbyl substituted aromatic acids are o,m-dichloro-p-(chloro-tert-butyl)benzoic acid, p-(trichloro-tert-butyl)-benzoic acid, 3,5-di(trichloro-tert-butyl)benzoic acid, 4-(chloro-tert-butyl)-phthalic acid, m-(2,2-dichloromethyl-5-chloropentyl)benzoic acid, m-(fluoro-tert-butyl)benzoic acid, o-(bromo-tert-nonyl)benzoic acid, 5-(iodo-tert-hexyl)phthalic acid, m-(3,3-dichloromethyl-4-bromobutyl)benzoic acid, p-(1,1-dichloroethyl-5-chloropentenyl)benzoic acid, (chloro-tert-butyl)-1-naphthoic acid, and p-(trifluoro-tert-butyl)benzoic acid.

Preferred acids are those wherein the hydrocarbyl radical joined to the aromatic ring has a tertiary carbon atom at the free end of the radical. These will be referred to herein as tert-hydrocarbyl or tert-alkyl radicals. These particular acids include p-(chloro-tert-butyl)benzoic acid, p-(trichloro-tert-hexyl)benzoic acid, m-(bromo-tert-decyl)benzoic acid, m-chloro-p-(chloro-tert-amyl)benzoic acid, 3-chloro-5-(trichloro-tert-butyl)phthalic acid, and p-(fluoro-tert-butyl)benzoic acid.

Coming under special consideration, particularly because of their high herbicidal and fungicidal activity, are the aromatic monocarboxylic acids possessing a single aromatic ring wherein one of the ring carbon atoms is joined to a carboxyl group and at least one, and preferably from 1 to 2, other ring carbon atoms is or are joined to a halo-tert-alkyl radical which is substituted with a halogen atom of the group consisting of chlorine, bromine and fluorine, and the remaining ring carbon atoms are joined to a member of the group consisting of hydrogen, halogen and lower alkyl radicals, the total number of halogen atoms in the acid molecule varying from 1 to 8. This group of acids substituted with fluorine in the side chain are especially valuable because of the unique properties of the resinous products that may be derived therefrom or from their derivatives.

Particularly noteworthy because of their fine pesticidal properties and ease of production are the aromatic monocarboxylic acids possessing a single aromatic ring wherein one of the ring carbon atoms is joined to a carboxyl group and one other ring carbon atom, preferably in the para position thereto, is joined to a chloro-tert-alkyl radical, preferably containing from 4 to 18 and more preferably from 4 to 12 carbon atoms, and substituted with from 1 to 3 chlorine atoms, and the remaining ring carbon atoms are joined to a member of the group consisting of hydrogen, halogen and lower alkyl radicals.

The halohydrocarbyl substituted aromatic acids of the present invention may be prepared by any suitable method. They are preferably prepared by halogenating the corresponding hydrocarbyl substituted aromatic acid in the liquid phase in the presence of a catalyst, such as light, which is known to promote halogenation on the side chain. Hydrocarbyl substituted aromatic acid used in this reaction may be exemplified by tert-butylbenzoic acid, p-tert-octylbenzoic acid, m-tert-nonylbenzoic acid, 4-tert-octyl-phthalic acid, 3,5-di(tert-butyl)benzoic acid, tert-butyl-tert-nonylbenzoic acid, and the like.

The light rays employed as catalyst in this reaction are generally the ultraviolet rays having wave lengths between 1800 and 7000 Angstroms and more preferably between 2500 Angstroms and 5000 Angstroms. Such rays are generally provided by conventional quartz or fluorescent lighting tubes.

The halogenation may be accomplished in the presence or absence of solvents or diluents. If solvents or diluents are employed they should preferably be organic compounds inert to the halogen employed in the process. Diluents that are inert to iodine, bromine and chlorine include tetrachloroethane, trifluorochloroethane and monofluorotrichloroethane.

The amount of the substituted aromatic acid and the halogen employed in the reaction will vary over a considerable range depending upon the type of product desired, i. e., a mono-, di-, tri-, etc. substituted acid. In general, one mole of halogen should be utilized for every hydrogen atom on the side chain to be replaced. In some cases, it may be desirable to employ the acid or halogen in slight excess of the stoichiometric quantity.

The temperature employed in the halogenation reaction may vary over a considerable range. Suitable temperatures generally range from about 50° C. to about 300° C. and in some cases from 100° C. to about 200° C. In general, the higher temperatures tend to favor substitution in the side chain over nuclear substitution and such temperatures are usually the more preferred. Satisfactory results are obtained in many cases by conducting the reaction at or near the boiling temperature of the acid being halogenated. Atmospheric, superatmospheric, or subatmospheric pressures may be employed as desired.

The manner of introducing the halogen will vary depending upon the particular halogen selected. When iodine is employed it is generally desirable to dissolve the iodine in a solvent and this mixture to the solution containing the aromatic acid. Bromine may be added directly or combined with a solvent. When chlorine and fluorine are used it is generally desirable to employ them in gaseous form and pass the gas directly into the reaction mixture.

Conventional means are generally employed for removing the hydrogen halide formed during the halogenation reaction. The halo-substituted acids formed in the reaction may be recovered by any suitable means, such as distillation, extraction, filtration, and the like.

The apparatus employed in the halogenation reaction may be of any construction or design that provides means for exposing the reaction mixture to the ultraviolet rays and means for adding and removing the necessary ingredients. A glass reaction kettle surrounded by quartz tubes and equipped with means for removing the hydrogen halide formed in the reaction has generally been found satisfactory.

If halogenation of the ring is also desired this may be accomplished by the conventional procedure, such as halogenation in the presence of catalysts, such as aluminum chloride, etc.

The novel halohydrocarbyl substituted aromatic acids have definite herbicidal, fungicidal and insecticidal properties and may be employed with success as active ingredients in insecticidal, fungicidal and herbicidal spray and dust compositions. In such compositions the new acids may be dissolved in suitable non-corrosive organic solvents, emulsified with water and wetting and dispersing agents, or dispersed in and on finely divided solid carriers, such as diatomaceous earth, bentonite, talc, wood flour, etc. If desired, these acids may be employed in combination with pyrethrin- or rotenone-containing extracts or with other organic and inorganic insecticidal toxicants.

In addition to their use as herbicides, fungicides and insecticides the novel acids of the invention may be utilized in many other important applications, such as in the preparation of dyes and pigments, as additives for lubricating oils, as modifiers for alkyd-type resins, as anticorrosion agents, viscosity index improvers, and as asphalt adhesive agents.

The halohydrocarbyl substituted aromatic acids are also of value as intermediates in the production of many useful and valuable derivatives. Useful derivatives derived from these acids include salts, esters, anhydrides, chlorides and amides. Salts of these acids and metals, such as cobalt, iron, manganese and lead may be used, for example, as paint driers and as stabilizers for polymers, such as polyvinyl chloride. Salts of these acids and metals such as copper and mercury may be used as insecticides and wood preserving agents, or as additives for lubricating oils to increase the load carrying capacity of oil films or to prevent piston ring sticking in internal combustion engines. Other useful salts include the salts of the novel acids of the invention and sodium, potassium, aluminum, barium, cadmium, calcium, cerium, chromium, magnesium, mercury, nickel, strontium, thallium, tin, titanium, uranium, vanadium, and zinc. These salts may be prepared directly from the free acids or by double decomposition of their alkali metal salts.

Amides of the novel halohydrocarbyl substituted aromatic acids are of considerable value as insecticides, fungicides or herbicides or as additives for insecticidal, fungicidal or herbicidal compositions. The amides are also useful as additives for resinous compositions, particularly those of the alkyd-type, or as plasticizers or lubricants. Amides containing an unsaturated group may be polymerized with themselves or with other polymerizable unsaturated compounds to produce resins having unique properties. These amides may be prepared by reacting the desired amine with the halohydrocarbyl substituted aromatic acids, their anhydride or acid chloride according to the conventional procedure. Amines that may be used in this type of reaction include allyl amine, methallyl amine, isopropyl amine, decyl amine, dodecyl amine, phenyl amine, cyclohexylamine, and the like.

Esters having many unusual and beneficial properties and lubricants may be derived from the novel acids of the invention by esterifying them with monohydric or polyhydric alcohols or phenols. Such compounds include methanol, ethanol, butanol, amyl alcohol, octyl alcohol, nonyl alcohol, cyclohexanol, cyclopentanol, allyl alcohol, methallyl alcohol, butenol, cyclohexenol, phenol, benzyl alcohol, glycol monobutyrate, glycerol diacetate, ethylene glycol, propylene, glycol, 1,5-pentaneidol, glycerol, pentaerythritol, 1,2,5-hexanetriol, butanediol, 2,8-dodecanediol, glycerol monoethyl ether, glycerol allyl ether, tetrahydroxycyclohexane, 3,3'-thiodipropanol, 4,4'-thiodibutanol, polyallyl alcohol, polyvinyl alcohol, polymethallyl alcohol, and polyols formed by the condensation of bisphenols with epichlorohydrin, and the like.

Esters having exceptionally fine properties as plasticizers, particularly for the vinyl halide and vinylidene halide polymers, are those obtained by esterifying the novel acids with monohydric aliphatic alcohols containing at least five carbon atoms and preferably from 5 to 14 carbon atoms or polyhydric aliphatic alcohols, preferably containing from 2 to 8 carbon atoms, such as amyl alcohol, hexyl alcohol, nonyl alcohol, dodecyl alcohol, ethylene glycol, glycerol, pentaerythritol, mannitol, butanediol, 1,2,5-hexanetriol, and the like.

Esters derived from the novel acids and alcohols containing an unsaturated linkage, e. g., an ethylenic linkage, come under special consideration as they may be polymerized with themselves or with other polymerizable unsaturated organic compounds to produce resins having many superior characteristics, such as improved hardness and resistance to fire, as well as having excellent fungicidal properties and are ideally suited for use in preparing coverings for electrical equipment. Preferred alcohols to be used in preparing these esters include the alpha,-beta-ethylenically unsaturated monohydric alcohols containing from 2 to 15 carbon atoms, and the beta,gamma-ethylenically unsaturated aliphatic monohydric alcohols containing from 3 to 18 carbon atoms.

Examples of such alcohols are allyl alcohol, methallyl alcohol, 2-hexenol, 2-chloro-2-hexenol, 1-pentenol, 3-chloro-2-octenol, the theoretical vinyl alcohol and derivatives, and the like. Of special interest are the 2-alkenols containing from 3 to 12 carbon atoms.

Particularly valuable resins are obtained by copolymerizing the unsaturated esters of the novel acids with monomers containing a $CH_2=C=$ group, such as the vinyl aromatic compounds as styrene, chlorostyrene, alpha-methyl styrene, alpha-methylchlorostyrene, the vinyl halides, as vinyl chloride, vinyl bromide and vinyl fluoride, the vinylidene halides, such as vinylidene chloride, the ethylenically unsaturated nitriles, such as acrylonitrile, and methacrylonitrile, the unsaturated esters of the aliphatic acid esters wherein the ethylenic linkage is in either the alcohol or acid portion of the molecule, such as allyl acetate, vinyl acetate, allyl propionate, butyl acrylate, unsaturated esters of polybasic acids, such as diallyl phthalate, diallyl succinate, diallyl adipate, methallyl adipate, di(chloroallyl)phthalate, diallyl oxalate, triallyl citrate, and the like. The monomers may be combined in a wide variety of proportions. Polymers having the desired properties are generally obtained when the esters of the novel acids vary from 5% to 95% by weight of the total reactants and the dissimilar substituent varys from 95% to 5%.

The homopolymers and copolymers of the above-described unsaturated esters of the novel acids may be prepared in an aqueous emulsion or suspension, solution or in bulk by the application of heat, light or polymerization catalyst such as benzoyl peroxide, tert-butyl hydroperoxide, tert-butyl perbenzoate, and the like, in amounts generally varying from 0.1% to 5% by weight. Temperatures employed generally vary from 50° C. to 200° C.

The above-described esters may be prepared by any suitable method. They may be prepared by direct esterification of the novel acids and alcohols, by reacting an acid chloride of the novel acids with the alcohol in pyridine, or by an ester-exchange reaction. They are preferably prepared, however, by direct esterification of the acid with the alcohol. Esterification catalysts, such as p-toluenesulfonic acid, ethanesulfonic acid, hydrobromic acid, chloroacetic acid, sulfuric acid, formic acid, boron and silicon fluorides, acid salts, and salts of strong acids and weak bases, may be utilized as desired, generally in amounts varying from about 0.1% to 5% by weight of the reactants. In such reactions, an organic reaction solvent such as toluene, benzene, xylene, etc. may be employed as desired. Temperatures employed in the esterification may vary over a considerable range, but will generally vary between 50° C. to about 150° C. Preferred temperatures range from about 80° C. to 100° C. The esters formed in the reaction mixture may be recovered therefrom by any suitable means, such as extraction, distillation, fractional precipitation, and the like.

As indicated, the above-described amide and ester derivatives are particularly valuable as plasticizers for organic thermoplastic material or materials. These may include one or more natural or synthetic resins, such as cellulose derivatives as cellulose nitrate or nitrocellulose, cellulose acetate, cellulose acetobutyrate, cellulose acetopropionate, ethyl cellulose and benzyl cellulose, polymers and interpolymers of vinyl-type compounds, i. e., compounds containing a $CH_2=C=$ group, as vinyl chloride, vinyl acetate, vinylidene chloride, methyl methacrylate and acrylonitrile, styrene, dichlorostyrene, vinyl benzoate, vinyl caproate, allyl acetate, allyl propionate, and the like, and mixture thereof. Preferred materials to be plasticized are the vinyl halide polymers, i. e., polymers containing a predominant quantity, such as at least 60% by weight, of a vinyl halide as vinyl chloride and vinyl bromide.

The amide and ester derivatives may be used as plasticizers alone, in combination with one another or in combination with other plasticizers, such as dioctyl phthalate, dibutyl phthalate, dihexyl phthalate, tricresyl phosphate, and the like. The amount of the derivatives to be incorporated with the resinous materials will vary over a considerable range depending upon the type of resin to be plasticized, intended use of the composition, etc. In most cases the amount of the plasticizer will vary from about 20 parts to 150 parts by weight for every 100 parts of resins, or more preferably 40 parts to 75 parts of plasticizer per 100 parts of resin. Fillers, pigments, stabilizers, and plasticizer extenders may also be added with the derivatives. The plasticizer and resin may be compounded together by means of conventional equipment such as mills of the heated roll type or internal mixers. The plasticizer and other compounded ingredients are worked into the resin so that they are thoroughly dispersed therein by means of such equipment and the resulting composition then molded, calendered, extruded or otherwise formed into articles of the desired shape by conventional procedure.

To illustrate the manner in which the invention may be carried out the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

A mixture of about 500 parts of carbon tetrachloride and 89 parts of tert-butylbenzoic acid was placed in a glass reaction flask and heated to boiling. The flask was then exposed to ultraviolet light and 39 parts of chlorine bubbled into the reaction mixture. When the required quantity of chlorine had been added the solution was filtered and on cooling a white, crystalline product settled out. This product had a melting point of 130.5 to 131.5° C. and was identified as (monochloro-tert-butyl)benzoic acid.

This compound was found to have very high toxic action against weeds and plant insects. It was also found to have unusual properties as a fungicide, particularly against *Monolinia fructicola* and *Alternaria oleracea*.

(Dichloro-tert-butyl)benzoic acid was prepared by the above-described process by increasing the chlorine to 78 parts.

*Example II*

A mixture of about 500 parts of carbon tetrachloride and 89 parts of tert-butylbenzoic acid was placed in a glass flask and heated to boiling as shown in Example I. The flask was then exposed to ultraviolet light and 117 parts of chlorine bubbled into the reaction mixture. When the required quantity of chlorine had been added, the solution was filtered and then allowed to cool. The crystalline product that settled out had a melting point of 111° C. to 112° C. and was identified as (trichloro-tert-butyl)benzoic acid.

This compound was also found to be effective as a fungicide and herbicide and in most cases was even more effective against many of the agriculture weeds than the monochloro derivative shown in Example I. Acids having related properties are obtained by substituting equivalent amounts of each of the following aromatic acids for the tert-butylbenzoic acid in the above-described process: p-tert-amylbenzoic acid, p-tert-decylbenzoic acid, m-tert-octylbenzoic acid, 4-tert-butylphthalic acid and p-tert-dodecylbenzoic acid.

*Example III*

About 500 parts of carbon tetrachloride and 117 parts of di(tert-butyl)benzoic acid are placed in a glass flask and heated to boiling. The flask is then exposed to ultraviolet light and about 230 parts of chlorine bubbled into the reaction mixture. When the required quantity of chlorine has been added, the solution is filtered and on cooling a crystalline product settled out. The product was identified as di(trichloro-tert-butyl)benzoic acid.

The compound possesses outstanding properties as an insecticide, herbicide and fungicide.

*Example IV*

About 500 parts of carbon tetrachloride is combined with 89 parts of tert-butylbenzoic acid and the resulting mixture heated to boiling. The mixture is then exposed to ultraviolet light and about 85 parts of bromine added to the mixture. After the required quantity of bromine has been added, the solution is then filtered and cooled. The crystalline product that settles out is identified as (bromo-tert-butyl)benzoic acid.

*Example V*

The process in Example IV is repeated using an equivalent amount of gaseous fluorine which is prepared by electrolysis of pure hydrogen fluoride in the presence of an alkali metal salt. The acid recovered therefrom is identified as (fluoro-tert-butyl)benzoic acid.

*Example VI*

About 100 parts of (trichloro-tert-butyl)benzoic acid, 40 parts of sodium hydroxide and 1000 parts of distilled water are placed in a flask, heated to boiling and the pH adjusted to 10.5 to 11. 300 parts of this solution is evaporated to dryness to recover sodium (trichloro-tert-butyl)-benzoate. The remaining portion is treated with 88 parts of copper sulfate dissolved in 500 parts of boiling water. The flask is then heated on a water bath for several hours after which the copper salt was easily filtered on a Buchner filter. The salt was greenish blue, substantially water insoluble and oil soluble. Compostions containing the salt have good insecticidal properties.

*Example VII*

About 290 parts of (trichloro-tert-butyl)benzoic acid produced in Example II is mixed with 100 parts of allyl alcohol, 150 parts of toluene and 3 parts of p-toluenesulfonic acid and the resulting mixture heated under reflux. The water formed during the reaction is removed by azeotropic distillation with the toluene. After the reaction is complete, the mixture is distilled to produce allyl (trichloro-tert-butyl)benzoate, a colorless mobile liquid.

Esters having related properties are obtained by substituting equivalent amounts of each of the following alcohols for the allyl alcohol in the above-described process: methallyl alcohol, chloroallyl alcohol, butenol and 2,4-hexadienol.

*Example VIII*

About 210 parts of (chloro-tert-butyl)benzoic acid was mixed with 80 parts of ethanol, 150 parts of toluene and 3 parts of p-toluene-sulfonic acid and the resulting mixture heated under reflux. The water formed during the reaction was removed by azeotropic distillation as shown in the preceding example. After the reaction was complete, the mixture was distilled to produce ethyl (chloro-tert-butyl)benzoate, a colorless liquid having a boiling point of 125–7° C. (0.05 mm.), per cent chlorine, calculated 14.7%, found 14.7%.

Esters having related properties are obtained by replacing the ethanol in the above-described process with each of the following alcohols: octyl alcohol, nonyl alcohol, hexyl alcohol, dodecanol and isobutyl alcohol.

*Example IX*

About 250 parts of (dichloro-tert-butyl)benzoic acid was mixed with 80 parts of ethanol, 150 parts of toluene and 3 parts of p-toluenesulfonic acid and the resulting mixture heated under reflux. The water was removed as shown in the preceding example. After the reaction was complete, the mixture was distilled to produce ethyl (dichloro-tert-butly)benzoate, a colorless liquid having a boiling point of 146–9° C. (0.05 mm.), per cent chlorine, calculated 25.8%, found 26.0%.

*Example X*

The allyl (trichloro-tert-butyl)benzoate produced in Example V is mixed with 2 parts of di-tert-butyl peroxide and the mixture heated at 130° C. for a short period. At the end of the heating period, the mixture is distilled to remove the unreacted monomer and catalyst decomposition products. The resulting product is a soft, relatively colorless solid.

*Example XI*

About 100 parts of poly(vinyl chloride) are compounded with 50 parts of octyl (trichloro-tert-butyl)benzoate by mixing the two ingredients together with two parts per 100 parts of polymer of a trade stabilizer, milling the mixture together on a roll mill at a temperature between 130° C. and 150° C., and then molding the resulting sheet at 160° C. for two minutes. The resulting sheet possesses good tensile strength and flexibility and has improved flame resistance.

We claim as our invention:

1. (Chloro-tert-butyl)benzoic acid.
2. (Trichloro-tert-butyl)benzoic acid.
3. (Bromo-tert-butyl)benzoic acid.
4. A copper salt of (trichloro-tert-butyl)benzoic acid.
5. Ethyl (chloro-tert-butyl)benzoate.
6. A benzoic acid having one of its ring carbon atoms attached to a tert-alkyl radical containing from 4 to 12 carbon atoms and having at least one chloro-substituted aliphatic carbon atom attached to the tertiary carbon atom.
7. A benzoic acid having one of its ring carbon atoms attached to a tert-alkyl radical having at least one of the aliphatic carbon atoms attached to the tertiary carbon atom substituted with a halogen of the group consisting of chlorine, bromine and fluorine.
8. A benzoic acid having one of its ring carbon atoms attached to a hydrocarbon radical which when attached to the said ring contains a quaternary carbon atom which is joined to at least one halo-substituted aliphatic carbon atom.
9. An aromatic acid having at least one of its ring carbon atoms attached to a hydrocarbon radical which when attached to the said ring contains at least one quaternary carbon atom which is joined to at least one halo-substituted aliphatic carbon atom.

10. An ester of a benzoic acid having one of its ring carbon atoms attached to a tert-alkyl radical containing from 4 to 12 carbon atoms and having at least one chloro-substituted aliphatic carbon atom attached to the tertiary carbon atom, and an alkanol containing no more than 14 carbon atoms.

11. A copper salt of a benzoic acid having one of its ring carbon atoms attached to a hydrocarbon radical which when attached to the said ring contains a quaternary carbon atom which is joined to at least one halo-substituted aliphatic carbon atom.

12. A compound of the group consisting of aromatic acids having at least one of their ring carbon atoms joined to a hydrocarbon radical which when attached to the said ring contains at least one quarternary carbon atom which is joined to at least one halo-substituted aliphatic carbon atom, their copper and mercury salts, their alkanol esters wherein the alkanols contain no more than 14 carbon atoms, their alkenol esters wherein the alkenols contain no more than 12 carbon atoms, and their N-lower alkyl amides.

13. A herbicidal composition containing (trichloro-tert-butyl)benzoic acid and a herbicidal adjuvant as a carrier therefor.

14. A herbicidal composition containing an aromatic acid having at least one of its ring carbon atoms attached to a hydrocarbon radical which when attached to the said ring contains a quaternary carbon atom which is joined to at least one halo-substituted aliphatic carbon atom, and a herbicidal adjuvant as a carrier therefor.

15. A trichloro-tert-alkyl substituted benzoic acid wherein the trichloro-tert-alkyl group has a chloro-substituted aliphatic carbon atom attached to the tertiary carbon atom and contains from 4 to 12 carbon atoms.

16. An aromatic acid having at least one of its ring carbon atoms attached to a trihalo-substituted hydrocarbon radical which, when attached to the said ring, contains at least one quaternary carbon atom which is joined to a halo-substituted aliphatic carbon atom.

17. A di(trichloro-tert-butyl)benzoic acid.

References Cited in the file of this patent
UNITED STATES PATENTS

| | | |
|---|---|---|
| 1,014,859 | Taub et al. | Jan. 16, 1912 |
| 1,022,645 | Taub et al. | Apr. 9, 1912 |
| 1,482,416 | Snelling | Feb. 5, 1924 |
| 1,715,251 | Sabalitschka et al. | May 28, 1929 |
| 1,889,383 | Schmidt | Nov. 29, 1932 |
| 1,953,629 | Pfaff et al. | Apr. 3, 1934 |
| 1,975,054 | Steindorf | Sept. 25, 1934 |
| 1,982,787 | Cherry | Dec. 4, 1934 |
| 2,157,697 | Hagedorn | May 9, 1939 |
| 2,275,312 | Tinkler et al. | Mar. 3, 1942 |

OTHER REFERENCES

Auwers: Ber. Deut. Chem., vol. 38, page 1709 (1905).

Wegler et al.: Chem. Abstracts, vol. 31, page 5795 (1937).

Foreman et al.: Chem. Abstracts, vol. 34, col. 6238 (1940).

Auwers: Beilstein (Handbuch, 4th ed.), vol. 9, page 549 (1926).